(12) United States Patent
Smith et al.

(10) Patent No.: US 8,213,018 B2
(45) Date of Patent: Jul. 3, 2012

(54) CONSTANT OPTICAL POWER SENSOR USING A LIGHT SOURCE CURRENT SERVO COMBINED WITH DIGITAL DEMODULATION INTENSITY SUPPRESSION FOR RADIATION AND VIBRATION INSENSITIVITY IN A FIBER OPTIC GYROSCOPE

(75) Inventors: Douglas E. Smith, Phoenix, AZ (US); Steven J. Sanders, Scottsdale, AZ (US); Derek Mead, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 50 days.

(21) Appl. No.: 12/943,352

(22) Filed: Nov. 10, 2010

(65) Prior Publication Data

US 2012/0113432 A1    May 10, 2012

(51) Int. Cl.
    *G01C 19/72* (2006.01)
(52) U.S. Cl. .......................... 356/460; 356/464
(58) Field of Classification Search .............. 356/459, 356/460, 464, 483; 73/504.01
    See application file for complete search history.

(56) References Cited

U.S. PATENT DOCUMENTS

| | | | |
|---|---|---|---|
| 4,848,910 A | 7/1989 | Dupraz | |
| 4,865,449 A | 9/1989 | Lefevre | |
| 5,020,913 A * | 6/1991 | Okada et al. | 356/464 |
| 5,024,535 A | 6/1991 | Winston, Jr. | |
| 5,080,489 A | 1/1992 | Nishikawa et al. | |
| 5,136,600 A | 8/1992 | Fidric et al. | |
| 5,141,316 A * | 8/1992 | Lefevre et al. | 356/464 |
| 5,196,904 A | 3/1993 | Dane et al. | |
| 5,208,652 A | 5/1993 | Sonobe et al. | |
| 5,264,914 A | 11/1993 | Oho et al. | |
| 5,329,349 A | 7/1994 | Patterson et al. | |
| 5,392,303 A | 2/1995 | Shiozawa et al. | |
| 5,410,515 A | 4/1995 | Bielas et al. | |
| 5,444,533 A | 8/1995 | Nishiura et al. | |
| 5,465,149 A | 11/1995 | Strandjord et al. | |

(Continued)

FOREIGN PATENT DOCUMENTS

JP    59013910 A * 1/1984

OTHER PUBLICATIONS

European Patent Office, "European Search Report", mailed Feb. 28, 2012, Published in: EP.

*Primary Examiner* — Michael A Lyons
(74) *Attorney, Agent, or Firm* — Fogg & Powers LLC

(57) ABSTRACT

Systems and methods for fiber-optic gyroscopes are provided. In one embodiment, a fiber-optic gyroscope comprises: a light source current servo coupled to a light source that transmits light through an optic path, wherein the light source current servo controls intensity of light through the optic path via a light source current drive that supplies current to power the light source; and an intensity control signal processor coupled to the optic path via a photo detector, wherein the intensity control signal processor outputs an intensity control signal to the light source current servo, wherein the intensity control signal is a function of intensity of light as received at the photo detector; wherein the light source current servo compares the intensity control signal against a stable analog voltage reference to adjust the light source current drive and drive optical power at the photo detector towards a constant level.

20 Claims, 8 Drawing Sheets

U.S. PATENT DOCUMENTS

| | | | |
|---|---|---|---|
| 5,469,257 A | 11/1995 | Blake et al. | |
| 5,530,545 A | 6/1996 | Pavlath | |
| 5,708,687 A | 1/1998 | Powell et al. | |
| 5,812,263 A | 9/1998 | Morgan | |
| 5,812,572 A | 9/1998 | King et al. | |
| 5,898,496 A | 4/1999 | Huang et al. | |
| 5,923,424 A | 7/1999 | Sanders et al. | |
| 5,926,275 A * | 7/1999 | Sanders et al. | 356/464 |
| 6,028,668 A | 2/2000 | Rider | |
| 6,215,809 B1 | 4/2001 | Ziari et al. | |
| 6,359,918 B1 | 3/2002 | Bielas | |
| 6,657,729 B2 | 12/2003 | Lo et al. | |
| 6,744,966 B2 | 6/2004 | Ang et al. | |
| 6,765,678 B2 | 7/2004 | Strandjord et al. | |
| 7,038,783 B2 | 5/2006 | Standjord et al. | |
| 7,167,250 B2 | 1/2007 | Chen et al. | |
| 7,333,209 B2 | 2/2008 | Greening et al. | |
| 7,388,670 B2 * | 6/2008 | Fellows | 356/459 |
| 2004/0233455 A1 | 11/2004 | Keller | |
| 2008/0079946 A1 | 4/2008 | Greening | |

\* cited by examiner

CONSTANT OPTICAL POWER SENSOR USING A LIGHT SOURCE CURRENT SERVO COMBINED WITH DIGITAL DEMODULATION INTENSITY SUPPRESSION FOR RADIATION AND VIBRATION INSENSITIVITY IN A FIBER OPTIC GYROSCOPE

CROSS REFERENCES TO RELATED APPLICATIONS

This application is related to the following United States patents applications, which are each hereby incorporated herein by reference in their entirety:

U.S. patent application Ser. No. 08/209,510, issued Nov. 7, 1995 as U.S. Pat. No. 5,465,149;

U.S. patent application Ser. No. 08/771,092, issued Sep. 22, 1998 as U.S. Pat. No. 5,812,263;

U.S. patent application Ser. No. 11/271,994, issued May 10, 2007 as U.S. Pat. No. 7,333,209;

U.S. patent application Ser. No. 10/041,192, issued Jul. 20, 2004 as U.S. Pat. No. 6,765,678;

U.S. patent application Ser. No. 10/443,958, issued May 2, 2006 as U.S. Pat. No. 7,038,783;

U.S. patent application Ser. No. 11/529,967, published Apr. 3, 2008 as U.S. Patent Publication 2008/0079946; and U.S. patent application Ser. No. 08/158,116, issued Nov. 21, 1995 as U.S. Pat. No. 5,469,257.

BACKGROUND

Fiber Optic Gyroscopes (FOGs) have been used to measure rotation rates or changes in angular velocity about an axis of rotation. A basic conventional fiber optic gyroscope (FOG) includes a light source, a beam splitting device, a coil of optical fiber and a system photo detector. The beam splitting device splits light from the light source into separate beams that propagate through the coil in counter-propagating directions and eventually converge at the photo detector. The rotational rate of the coil can be determined based on optical characteristics of the light received at the photo detector such as interference caused by the Sagnac effect, for example. In certain applications, the optical characteristics of interest require only very little optical power to be received at the photo detector to meet the performance requirements of the FOG. Besides reducing power consumption and heating effects, operating at a low optical power reduces bias instability due to non-linear optical effects. However, over the life of the FOG, the optical circuit develops more optical loss, meaning less optical power generated by the light source actually arrives at the photo detector. As less light is received at the photo detector, the sensor becomes less sensitive to rotation, exhibiting reduced rotation signal-to-noise ratio. When the light beam is transmitted at only a low optical power at beginning of life to mitigate nonlinear optical errors, relatively little margin is available to account for optical circuit aging before the sensor can no longer meet performance requirements.

One potential solution for this problem is to use digital electronics to increase occasionally the optical power output of the light source as the optical circuit becomes more lossy, to maintain a relatively constant optical power level as received at the photo detector. As practiced in the art of FOGs today, light sources are driven using very stable power references so that their optical power output is as constant as practicable, even though this does not result in a stable power level as received at the photo detector. This is because fluctuations in light source optical power can produce errors such as scale factor shifts in a FOG. In a similar way, introducing finite-step adjustments in optical power to address optical circuit aging may generate unacceptable scale factor errors within the gyroscope. For example, if a relatively common digital-to-analog converter (DAC) (having 12 bit resolution, for example) were used to generate a feedback signal to control the light source, the resulting step errors produced within the gyroscope would be intolerable for many applications. While higher resolution DACs can be employed, such devices require correspondingly larger footprints and power, and generate more heat.

For the reasons stated above and for other reasons stated below which will become apparent to those skilled in the art upon reading and understanding the specification, there is a need in the art for improved systems and methods for optical power control in fiber optic gyroscopes.

SUMMARY

The Embodiments of the present invention provide methods and systems for optical power control in fiber optic gyroscopes and will be understood by reading and studying the following specification.

In one embodiment, a fiber optic gyroscope comprises: a light source current servo coupled to a gyroscope light source that transmits light through an optic path, wherein the light source current servo controls intensity of the light through the optic path via a light source current drive that supplies current to power the gyroscope light source; and an intensity control signal processor coupled to the optic path via a photo detector, wherein the intensity control signal processor outputs an intensity control signal to the light source current servo, wherein the intensity control signal is a function of intensity of the light as received at the photo detector; wherein the light source current servo compares the intensity control signal against a stable analog voltage reference to adjust the light source current drive and drive optical power at the photo detector towards a constant optical power level.

BRIEF DESCRIPTION OF THE DRAWINGS

These and other features, aspects, and advantages are better understood with regard to the following description, appended claims, and accompanying drawings where:

In accordance with common practice, the various described features are not drawn to scale but are drawn to emphasize features relevant to the present invention. Like reference characters denote like elements throughout figures and text.

DETAILED DESCRIPTION

In the following descriptions, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical, electrical and method changes may be made without departing from the scope of the present invention. The following detailed description is, therefore, not to be taken in a limiting sense. Further, the various sections of this specification are not intended to be read in isolation but considered together with the teachings of the written description as a whole.

Embodiments of the present invention provide for a fiber optic gyroscope that delivers constant optical power at the photo detector using a light source current servo. Alternate embodiments further provide for combining a low bandwidth/low noise light source current servo with a high-bandwidth offset control or DC centering mechanism to suppress radiation and vibration sensitivity. Embodiments of the present invention may be used with either synchronous or asynchronous demodulation of the rotation rate signal.

As will be explained in greater detail below, the light source current servo described herein provides for slowly and smoothly adjusting light source current through a servo loop having a long time constant and without abrupt steps, glitches, hysteresis or noise. This provision has the benefit of keeping the rotation-signal to noise ratio constant while simultaneously allowing minimization of nonlinear optical errors. Alternate embodiments presented below, operate the servo 1) using an analog voltage to adjust light source current; 2) using electronics such as a field programmable gate array (FPGA), microprocessor, or application specific integrated circuit (ASIC) to generate a digital word to adjust light source current using a slow D/A converter, and an ultra-low bandwidth servo loop; and 3) using a delta sigma approach in addition to, and prior to the slow D/A converter, and ultra low bandwidth loop to adjust light source current.

Figure 1:
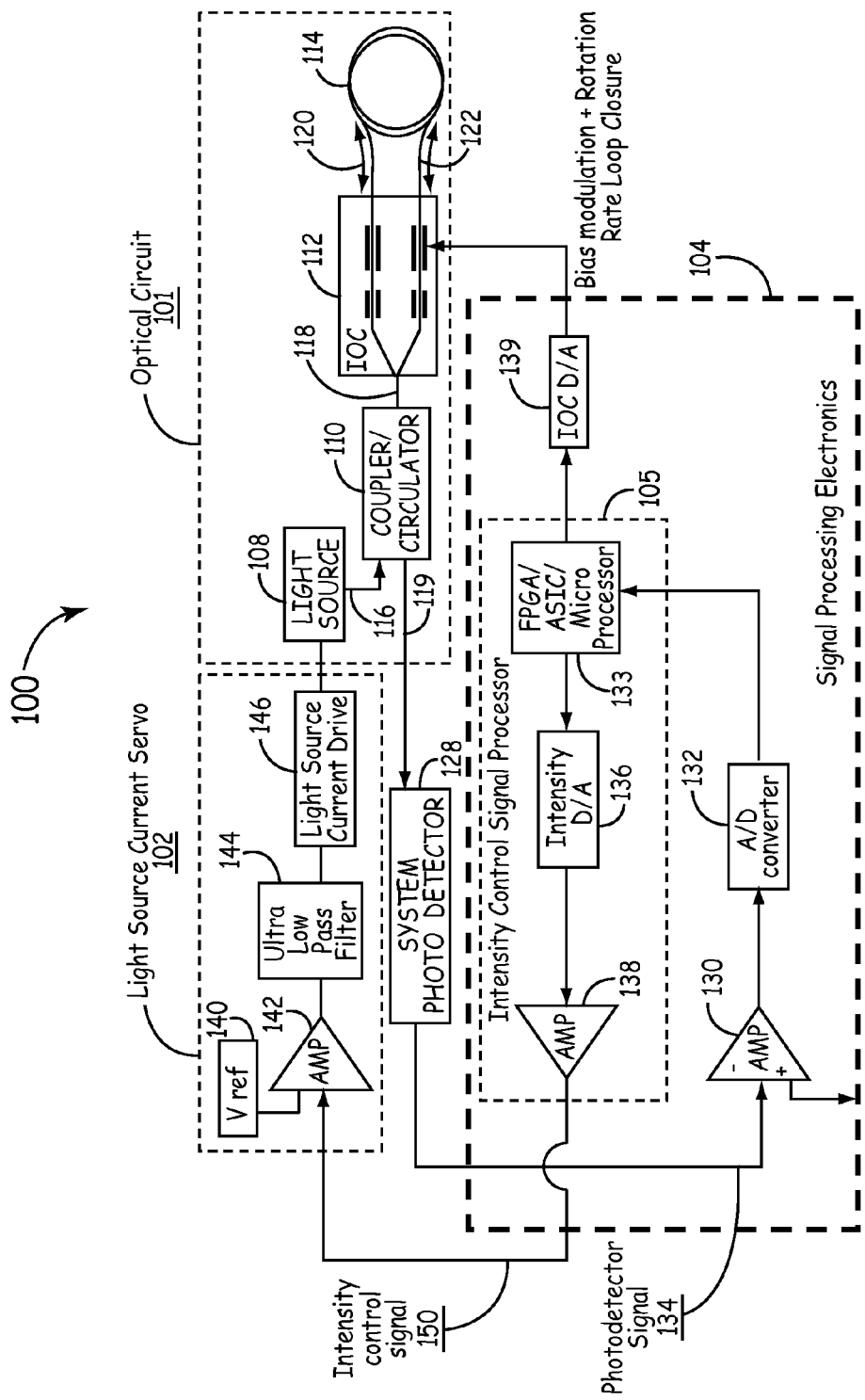
FIG. 1 is a simplified schematic diagram of a Fiber Optic Gyroscope of one embodiment of the present invention.

FIG. 1 is a simplified schematic diagram of a FOG 100 of one embodiment of the present invention. FOG 100 operates at constant optical power as received at the system photo detector. Constant-power operation is maintained by an intensity servo and light source current control servo driven by an Intensity Digital to Analog Converter and intensity control signal processing circuitry. The construction and operation of conventional FOGs is well known, and as such, will not be discussed in great detail. A representative discussion of FOGs may be found in U.S. Pat. No. 5,465,149 issued Nov. 7, 1995 to Strandjord, et al., and incorporated by reference herein.

As illustrated in FIG. 1, FOG 100 comprises a light source 108, a fiber coupler or circulator 110 (referred to herein generically as optical device 110), a multifunctional processing chip referred to herein as an integrated optics chip (IOC) 112, and a fiber optic coil 114, which are all variously connected by optical fiber portions 116, 118, 120, and 122. In one embodiment, coiled optical fiber forms the fiber coil 114 about a core or spool using a single mode optical fiber wrapped about the axis around which rotation is to be sensed.

The light source 108 comprises a broadband light source for propagating electromagnetic waves through the FOG 100. In one embodiment light source 108 is a semiconductor super luminescent diode or a rare earth doped fiber light source which provides electromagnetic waves in the infrared or optical part of the spectrum. In general, the light source 108 will have a short coherence length for emitted light to reduce the phase shift difference errors between these waves due to Rayleigh and Fresnel scattering at scattering sites in the fiber coil 114.

A system photo detector 128 detects electromagnetic waves, or light waves, impinging on it from an optical fiber portion 119, which in turn received the returning combined light beam from coupler 110. The system photo detector 128 generates an electrical current in response to the light wave it receives.

In operation, the light source 108 transmits a broadband light wave to a coupler or circulator 110 via the optic fiber 116. A circulator or coupler 110 transmits light from the light source to the IOC 112 and transmits light returning from the IOC 112 to the system photo detector 128. In some embodiments, the coupler 110 may direct a portion of the light source output to a separate photo detector for reduction of relative intensity noise (RIN), as discussed in FIG. 5 below.

The light transmitted to IOC 112, is further split into two light waves 124, 126 which in one embodiment are phase modulated, such as described in U.S. Pat. No. 5,465,149, incorporated herein by reference. The two light waves 124, 126 are transmitted to the fiber coil 114, via the optic fibers 120, 122. The light wave 124 propagates clockwise around the length of the fiber coil 114. Similarly, the light wave 126 propagates counterclockwise around the length of the fiber coil 114. After being transmitted from the fiber coil 114, back to the IOC 112 the two returning light waves 124, 126 are combined and then provided to the coupler 110. The coupler sends the combined light wave to system photo detector 128 which feeds the electrical current signal 134 to the signal processing electronics 104. The rotational rate of the coil 114 is determined by signal processing electronics 104 based on optical characteristics of the light received at the photo detector 128 from interference caused by the Sagnac effect.

In the embodiment of FIG. 1, constant optical power to the system photo detector 128 is maintained by use of a light source current servo 102 and intensity control signal processor 105. The intensity control signal processor 105 includes a processor 133 (which may be implemented using technologies such as a Field Programmable Gate Array (FPGA), Application Specific Integrated Circuit (ASIC) and/or a microprocessor that includes digital demodulation and accumulation functions) and intensity D/A converter 136 and an amplifier 138. Combined operation of the light source current servo 102 and the intensity control signal processor 105, enables the FOG 100 to maintain operation at an optical power that is sufficient to maintain constant optical power levels at system photo detector 128 throughout the life of the FOG 100. Further, an intensity control signal is produced having a DC voltage offset that does not vary with the intensity of the light as received at the system photo detector. Processor 133 further provides an output to IOC D/A converter 139 to provide the bias modulation signal used by IOC 112 to phase modulate the counter-propagating light beams travelling through coil 114.

As shown in FIG. 1, the signal 134 from system photo detector 128, upon receipt by signal processing electronics 105, is first amplified (at 130) and then digitized by an A/D converter 132 within the signal processing electronics 104. The digitized signal is then fed to processor 133 for calculation of a digital intensity control word that commands the intensity D/A converter 136. The intensity D/A converter 136 output is amplified (at 138) and fed to the light source current servo 102.

In the embodiment shown in FIG. 1, light source current servo 102 comprises a stable analog reference voltage 140, a comparing amplifier 142, an ultra-low pass filter 144 (having a time constant on the order of tau=1 msec to several hours, for example), and a light source current drive 146.

Light source current servo 102 functions to receive the output intensity control signal 150 and compares this signal with the stable analog reference voltage 140 representing a target or nominal optical power on the system photo detector 128. Deviations between the actual intensity D/A converter 136 output and the target value are servoed to null. The output of the light source current amplifier 142 is heavily low-pass filtered (at 144) to minimize short-term jitter such as quantization noise in optical power. This filtered output, which will slowly vary over the life of the FOG 100 in response to optical loss changes, is fed to light source current drive 146 to drive light source 108, thereby maintaining the system photo detector 128 optical power locked at the target or nominal value over life. In the example embodiment, the filter 144 is an ultra low bandwidth filter. However, it is understood that in alternative embodiments, the filtering can be accomplished by alternate filters known in the art, or in augmentation with, or alternate to a delta sigma approach to fine intensity control/filtering, as described in greater detail below.

FOG 100 thus provides the ability to slowly and continuously vary the current source in order to maintain constant optical power at the system photo detector 128, without introducing step errors or significant quantization noise. The ability to provide constant optical power at system photo detector 128 permits the systems to account for loss of light in any of the optical components in the FOG 100. This constancy of optical power at the system photo detector serves to stabilize the signal to noise ratio of the sensor at an intended design value. A second benefit is that stable optical power eliminates scale factor instability in some FOG configurations, such as the so-called open rate-loop FOG, wherein the rotation sensitivity—or scale factor—is directly proportional to optical power at the system photo detector. Further, the ability to operate FOG 100 at low optical power (that is, enough to deliver a tolerable optical signal-to-noise ratio at photo detector 128, yet low enough to minimize nonlinear errors proportional to optical power) reduces bias instability due to these non-linear optical effects. Finally, the light source current servo 102 creates a quiet system with low bandwidth, avoiding step errors introduced by sudden adjustments to optical power.

Figure 2:
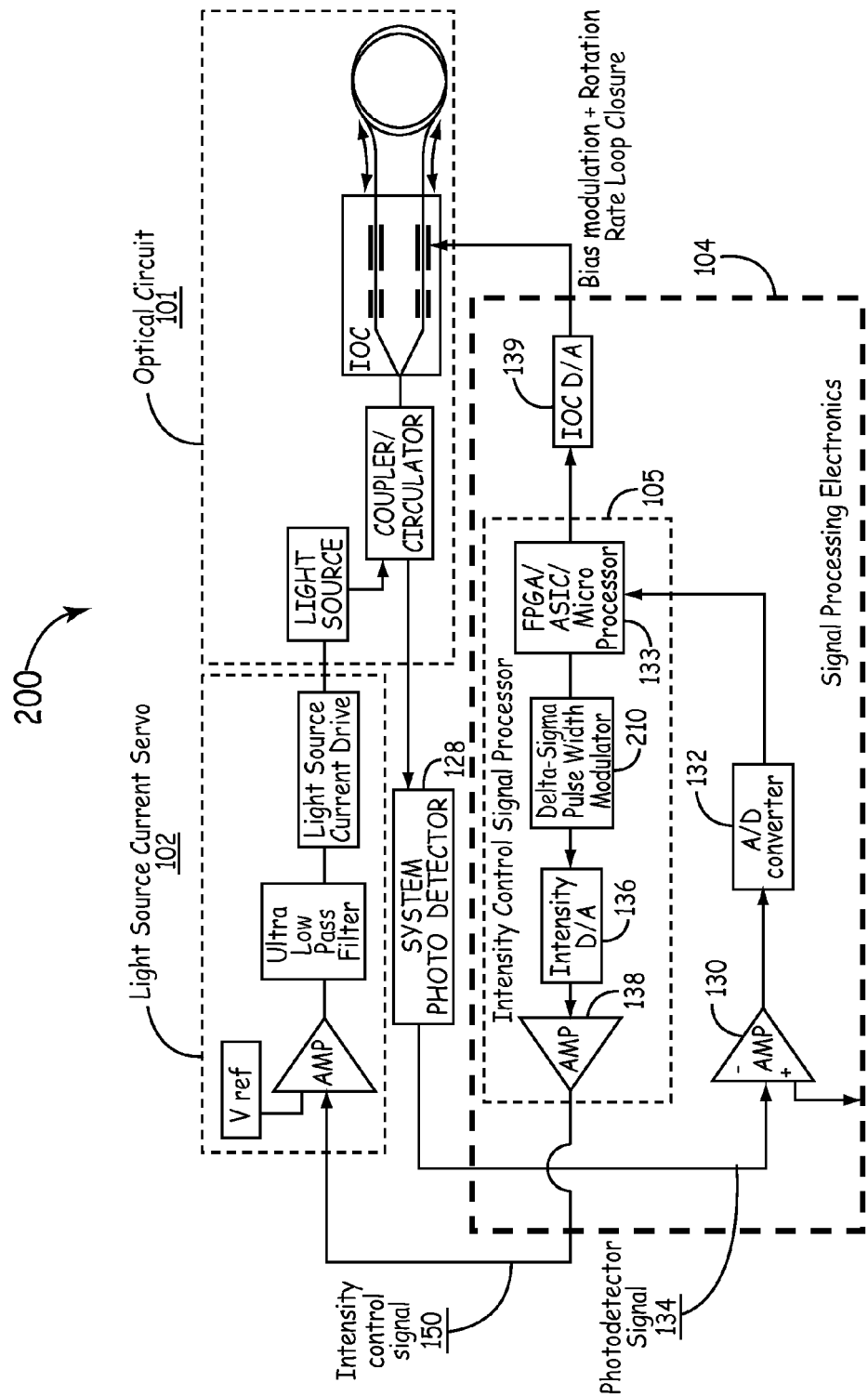
FIG. 2 is a simplified schematic diagram of a Fiber Optic Gyroscope of one embodiment of the present invention.

FIG. 2 is a schematic diagram of an alternative embodiment of a FOG 200 having the same configuration as the FOG 100 of FIG. 1, except that the Intensity Control Signal Processing shown at 105 further includes an optional delta sigma pulse width modulator 210 (also referred to as a delta sigma circuit) in which noise (created by sigma-delta pulse width modulation) is added to the intensity D/A converter signal to reduce quantization noise. In this alternative embodiment, the delta sigma pulse width modulator 210 effectively reduces the quantization of the intensity D/A converter 136 by rapidly dithering (pulse-width modulating) the least significant bits of the intensity D/A digital control word. In this manner, the delta sigma modulator 410 dramatically reduces quantization noise in the intensity servo control loop provided by intensity control signal processor 105 and light source current servo 102. Additional details regarding delta sigma pulse width modulation discussed below with respect to FIGS. 4A and 4B are applicable to the delta sigma pulse width modulator 210 of FIG. 2.

Figure 3:
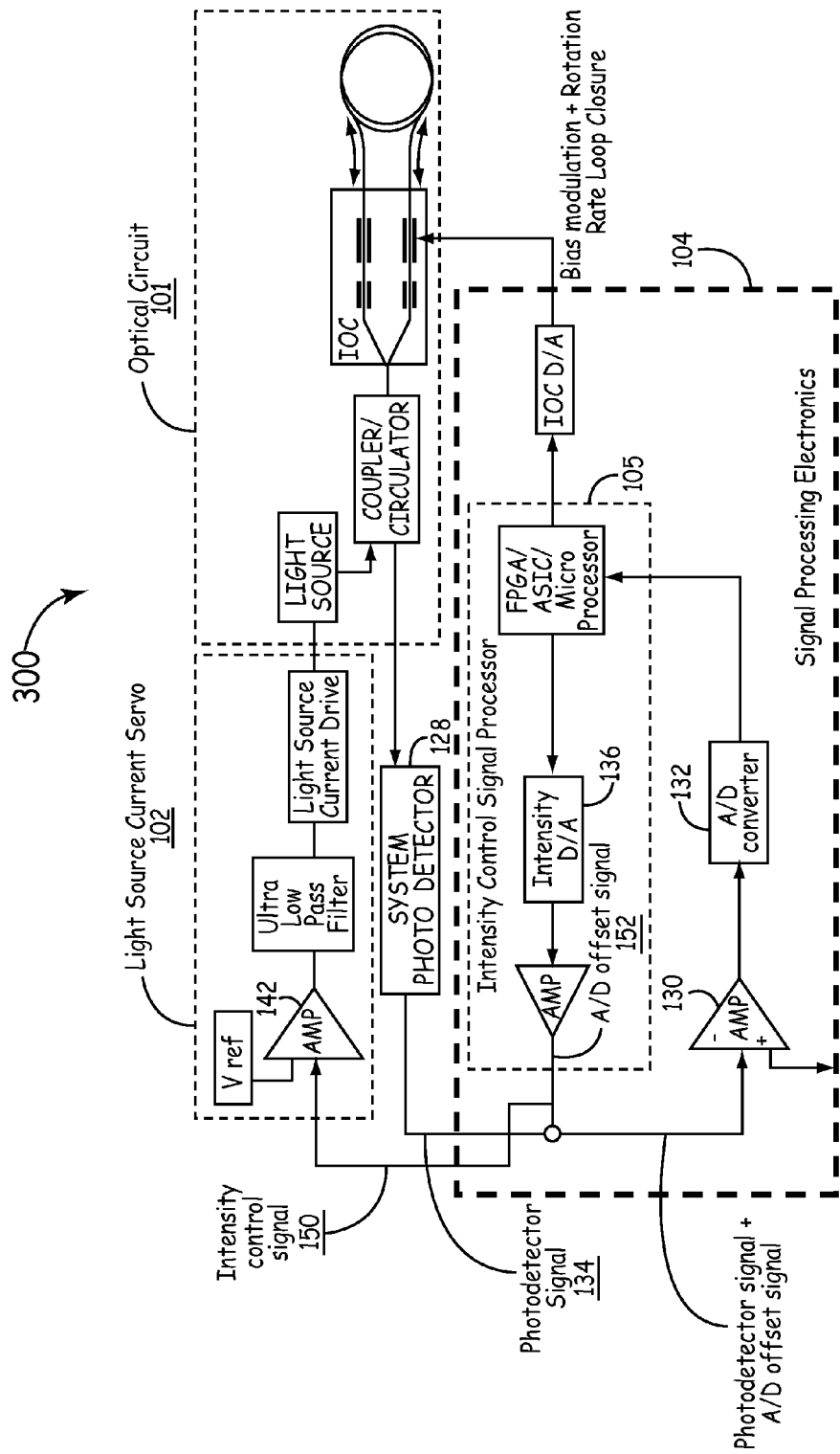
FIG. 3 is a simplified schematic diagram of a Fiber Optic Gyroscope of one embodiment of the present invention.

FIG. 3 shows that the intensity control servo can be easily and synergistically combined with other functionalities within FOG 100. For example, FIG. 3 shows an embodiment of a FOG 300 in which optical power control is combined with A/D offset signal control. A detailed explanation of A/D offset signal control may be found in U.S. Pat. No. 5,812,263 issued Sep. 22, 1998 to Morgan, and incorporated by reference herein. In short, A/D offset signal control is a means of ensuring that the system photo detector signal 134, after passing through amplifier 130, arrives at the A/D converter 132 centered in the finite voltage range of the A/D converter. Such centering not only prevents saturation of the A/D converter 132 (which would result in severe loss of FOG functionality), but also allows maximum gain application at amplifier 130 in order to maximize the rotation signal-to-noise ratio. Such A/D signal centering is important for preventing A/D saturation in rough external environments where events such as radiation or mechanical shock may create relatively rapid step-function changes in optical power and therefore A/D input voltage. Combining optical intensity control with A/D centering allows a FOG to mitigate slowly varying nonlinear optical errors (without introducing new noise) and at the same time keep the A/D centered even through radiation or shock events (which are much too fast for the optical intensity control to mitigate). Further, A/D signal centering minimizes gyroscope performance errors due to finite integral or differential nonlinearity in the A/D converter itself, as will be understood to those skilled in the art.

As FIG. 3 shows, the A/D centering signal 152 and the intensity control signal 150 can be conveniently generated using the single D/A converter 136. The relative bandwidths of the amplifiers 142 and 130 determine the timescales of interests for the two loops: the A/D centering function can be designed to null rapid changes at the A/D converter 132 input with hundreds of Hz bandwidth, while the light source current servo 102 simultaneously may minimize hourly or daily bias drift due to nonlinear optical errors. This combination offers the simultaneous benefits of preventing rapid environmental effects from saturating the A/D converter 132, of minimizing A/D converter 132 nonlinearity error, and servoing out the effects of slowly varying nonlinear optical errors.

Figure 4A:
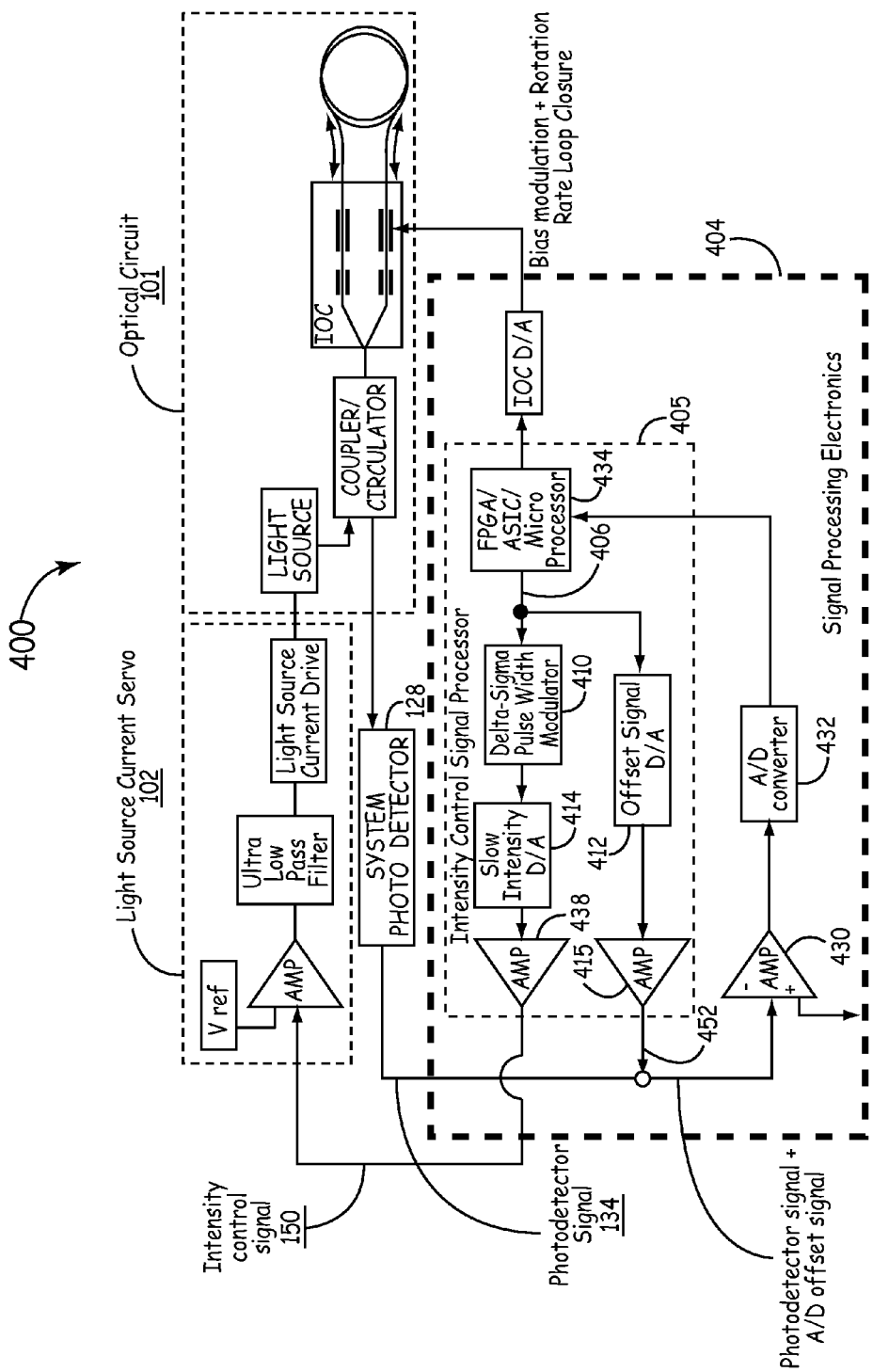
FIGS. 4A and 4B provide simplified schematic diagram of a Fiber Optic Gyroscope of one embodiment of the present invention.
Figure 4B:
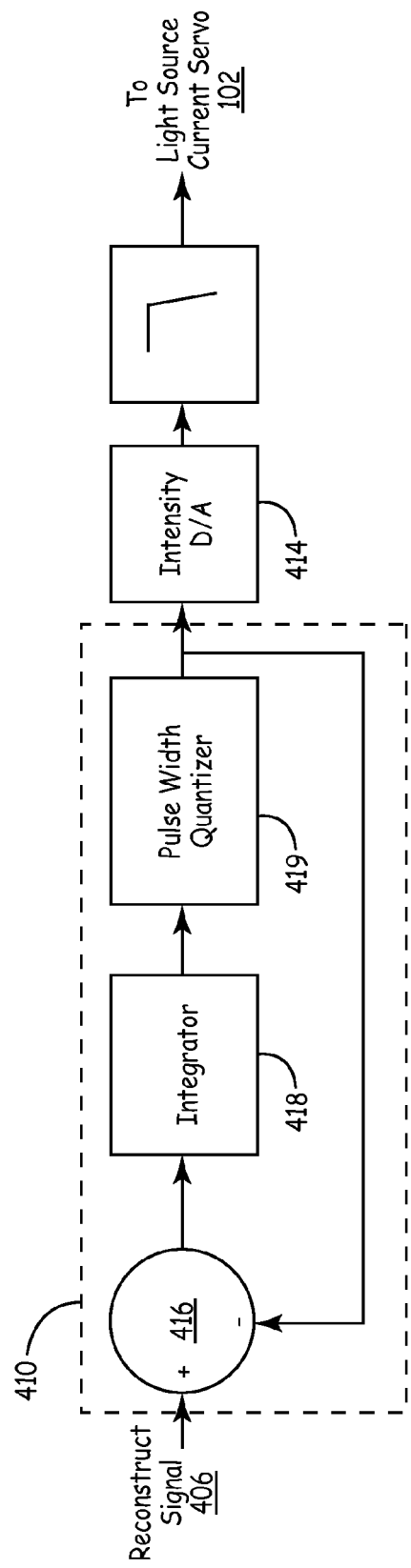

FIG. 4A shows one embodiment of a FOG 400 that offers the benefits of both high-bandwidth A/D centering and delta sigma pulse width modulation to minimize quantization noise in optical power control.

FOG 400 includes a Light source current servo 102 and Optical Circuit 101 such as described in FIGS. 1-3. FOG 400 further includes signal processing electronics 404 that includes a first amplifier 430, an A/D converter 432, and a processor 434 which operate as described with respect to amplifier 130, A/D converter 132 and processor 133 described above. Unlike FOG 100, in this embodiment the intensity control signal processor 405 includes two separate D/A converters: one to maintain the A/D centering (shown at 412) and a second (shown at 414) to null slow optical power drifts that would otherwise create nonlinear optical errors.

The intensity control D/A converter 414 is independent from the offset signal D/A converter 412 and relies on the signal 406 fed digitally into the delta sigma pulse width modulator 410. Signal 406 is provided to the delta sigma pulse width modulator 410 (also referred to as a delta sigma circuit) and eventually feeds the output signal 411 to the intensity D/A converter 414, much like the intensity D/A converter DAC 136 of FIG. 3, to convert the signal 406 into the analog domain to provide the intensity control signal 150 to light source current servo 102.

Meanwhile, the offset signal D/A converter 412 relies on the signal 406 to produce A/D centering signal 452, which is amplified (at 415), summed with the system photo detector signal 134 and provided back through amplifier 430 to drive the signal processing electronics 404. As mentioned above, A/D offset signal control is a means of ensuring that the system photo detector signal 134, after passing through amplifier 430, arrives at the A/D converter 432 centered in the finite voltage range of the A/D converter. Such A/D signal centering prevents saturation of A/D converter 432 (even under dynamic vibration, shock, and radiation conditions) and also minimizes FOG 400 performance errors due to finite integral or differential nonlinearity in the A/D converter itself, as will be understood to those skilled in the art.

The example embodiment of FIG. 4A has various advantages. First, by utilizing the independent intensity DAC 414, the light source current servo 102 is shielded from large changes in external environments that could potentially affect the output 452 of the offset signal D/A loop if assumed present in circuit. As such, the outer loop created by the light source current servo 102 can operate with lower-cost components and less filtering capability, yet still preventing potential noise from the loop 452 affecting functionality. Although in this case, two separate D/A converters are shown for clarity, (i.e., one for the offset control function and another for the intensity control with delta-sigma modulation) in some embodiments it is possible to perform both functions with a single D/A converter.

FIG. 4B is a schematic diagram of an embodiment of delta sigma pulse width modulator 410. The delta sigma pulse width modulator 410 receives signal 406 which is a high precision digital representation of optical power and uses balanced, high frequency pulse width modulation of intensity D/A converter 414 (at a frequency well above gyro noise sensitivities) to produce mean analog values having greater resolution than D/A converter 414 is capable of without this dithering. The output, as expressed by intensity D/A converter 414, is then provided to light source current servo 102 where it is compared against the high precision voltage reference 140. The initial value of light source current provided by the light source current servo 102 may be programmable by a user or an alternative functional circuit, and determined at the time of operation or at some time prior to operation. The delta sigma pulse width modulator 410 uses signal 406 and servos the mean output via an integrated feedback loop (comprising a summer 416, integrator 418 and Pulse Width Quantizer 419) and the ultralow bandwidth servo 102 to remove integrated error. That is, the finite quantization steps of the signal 406 are averaged out by dithering the signal 406 low order bits and then integrating in amplifier 418 with the loop bandwidth filters.

The delta sigma approach of FIGS. 4A and 4B also has a variety of advantages. First, much like the embodiment in FIG. 3, the delta sigma circuitry of modulator 410 is independent of the offset signal D/A loop within signal processing electronics 404 and therefore is not heavily affected by noise created within that comparatively high-bandwidth loop. Furthermore, the delta sigma approach permits sufficiently small pump current step changes with sufficiently filtered noise components to operate intensity control signal 150. Thus, the delta sigma approach of FIGS. 4A and 4B allows the light source current servo 102 to deliver high current control performance even using low-cost modest-performing, components.

Figure 5:
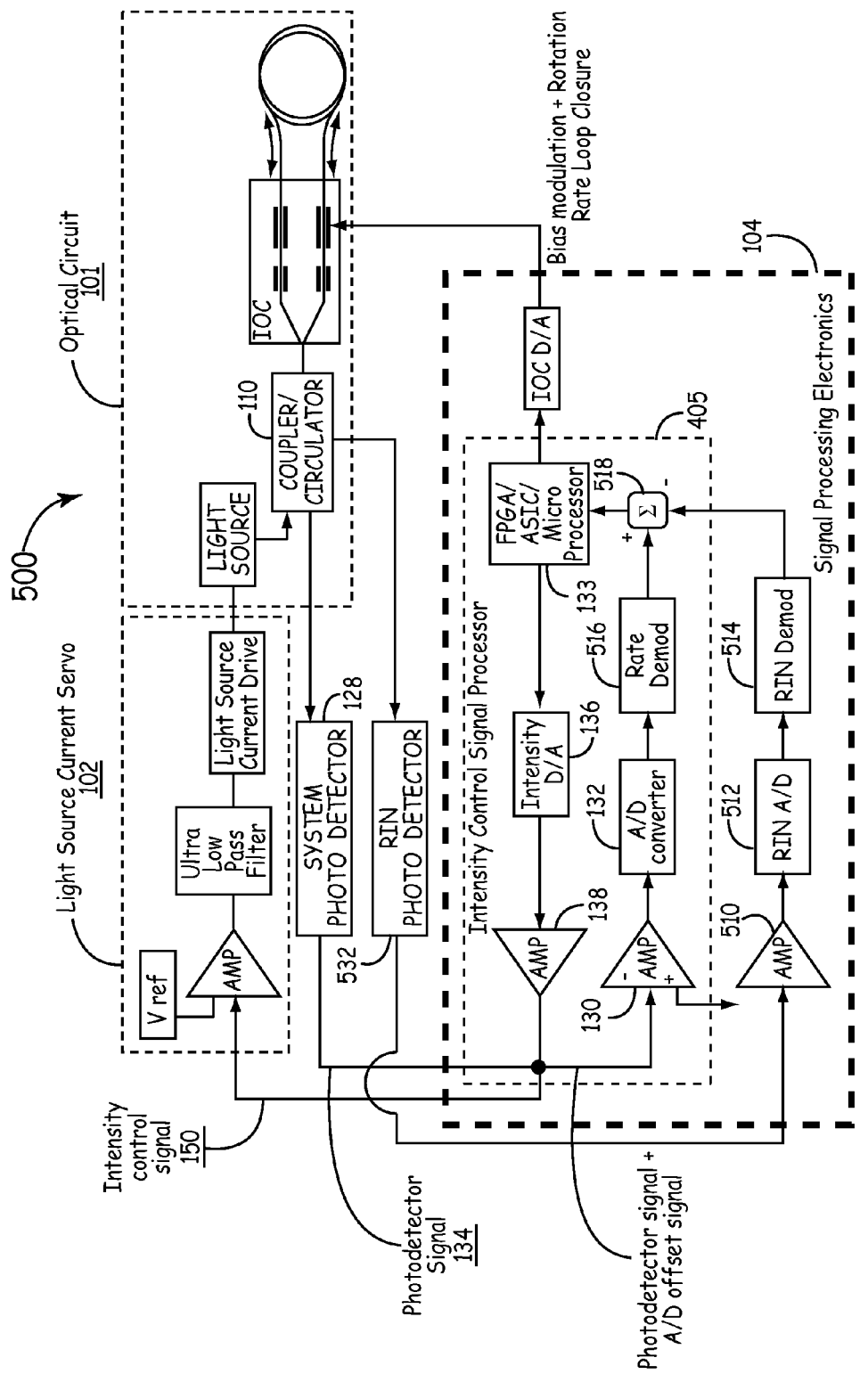
FIG. 5 is a simplified schematic diagram of a Fiber Optic Gyroscope of one embodiment of the present invention.

In yet another embodiment illustrated in FIG. 5, the control of optical power achieved by source current servo 102 can be combined with still other functionalities within FOG 100. For example, FIG. 5 shows an embodiment (generally at 500) in which the optical power control demonstrated in FIG. 3 is combined with additional circuitry within Signal Processing Electronics 104 to reduce the effects of relative intensity noise (RIN). RIN is often a dominant source of rotation rate measurement noise in FOGs, as is well known to those skilled in the art. U.S. Pats. No. 5,469,257 issued Nov. 21, 1995 to Blake et al and U.S. Pat. No. 6,765,678 issued Jul. 20, 2004, both incorporated by reference herein, describe methods to reduce the effect of RIN on FOG noise. FIG. 5 conveys an embodiment in which a second photo detector 532 (called RIN photo detector 532) coupled to coupler/circulator 110 senses the relative intensity noise generated in the light source 108. This noise is common mode with noise on the system photo detector 128, and therefore subtraction of the two photo detector signals results in a system photo detector signal with much of the RIN eliminated. This subtraction approach relies on accurate knowledge and/or normalization of the DC optical power on both photo detectors. In the embodiment of FIG. 5, Signal Processing Electronics 104 further comprises a RIN amplifier 510, a RIN A/D converter 512 and a RIN demodulation block 514. RIN amplifier 510 receives the output from RIN photo detector 532 and the RIN detector optical power can be determined from the output of the RIN demodulation block 514. A difference (taken at 518) between the output from RIN photo detector 532 and the output from a rate demodulator 516 (which is generated from system photo detector signal 134) is provided to processor 133. The system detector power can then be determined from the intensity D/A control word provided by processor 133 to intensity D/A converter 136.

Although the embodiments discussed above have described utilizing the system photo detector to stabilize optical power as measured from light exiting the optical coil, other embodiments within the scope of the present invention may alternately stabilize optical power entering the coil in order to, for example, correct for nonlinear optical effect near the entrance to the coil. One of ordinary skill in the art upon studying this specification would appreciate that this could be achieved by utilizing a photo detector (via a coupler, for example) that monitors optical power of the light beam traveling towards the coil, prior to the splitting of the light beam. A RIN photo detector is one example of where this optical power could be measured.

Figure 6:
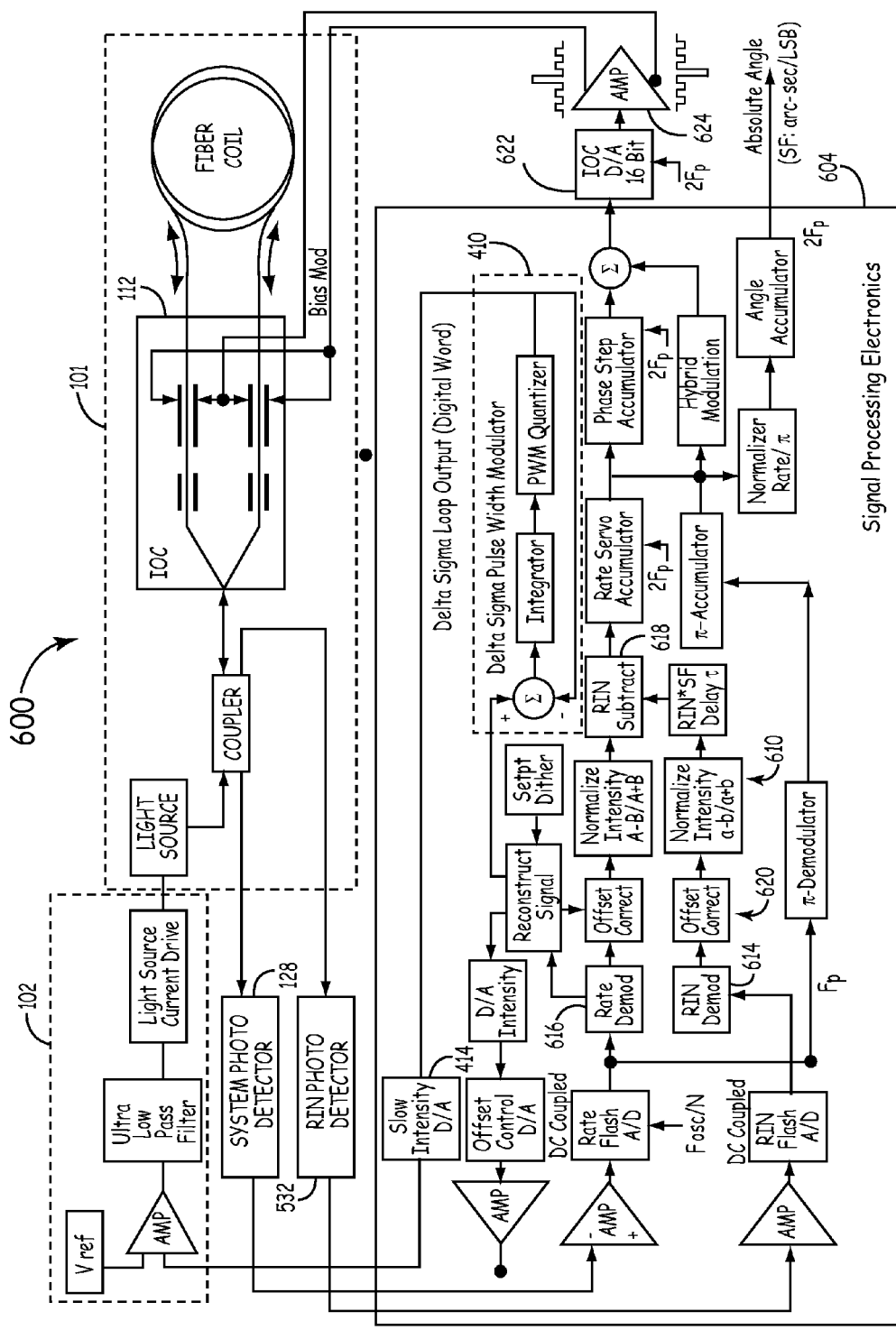
FIG. 6 is a simplified schematic diagram of a Fiber Optic Gyroscope of one embodiment of the present invention.

FIG. 6 illustrates one detailed embodiment (at 600) where optical power control of optical circuit 101 by light source current servo 102 is combined with RIN subtraction and another beneficial functionality, namely digital intensity normalization, to suppress the effects of rapid intensity modulations from vibrations up to kHz or even tens of kHz frequencies. Digital intensity normalization thus happens at very high bandwidth—much higher than optical intensity control, and even higher than A/D centering. Hence by combining optical intensity control, A/D centering, and digital intensity normalization, the embodiment of FIG. 6 covers a wider-than-ever range of frequencies/timescales over which error can be eliminated.

Within signal processing electronics 604, digital intensity normalization is implemented by a normalization circuit 610 such as that seen in FIG. 6. The concept of digital normalization is described in U.S. Pub. No. 2008/0,079,946 A1 published on Apr. 3, 2008 to Greening and incorporated by reference herein. In the embodiment of FIG. 6, both the Rate demodulation circuit 616 and RIN Demod 614 output signals are normalized at 610 before subtraction at 618. This normalization ensures that slow adjustments of optical power by the light source current servo 102 do not reduce the efficacy of RIN subtraction. Further, it may be understood that by combining low-bandwidth optical power control with higher-bandwidth A/D offset centering (shown generally at 620) and ultra-high bandwidth intensity normalization, it is possible to suppress gyroscope error mechanisms over a dynamic range from sub-Hz to tens of kHz.

Note that in alternative embodiments, the rate demodulation circuit 616 can be a synchronous or an asynchronous design, depending on the needs of the system. The details of synchronous and asynchronous demodulation designs are discussed in U.S. Pat. No. 7,333,209 issued May 10, 2007 to Greening, et al., and incorporated by reference herein. The optical power control provided by embodiment of the present invention is compatible with both synchronous and asynchronous demodulation. In one embodiment, the relative intensity noise-reduced rotation rate signal is used to generate an error suppression modulation signal that drives modulation of the light travelling through the optical path. Further, in one embodiment a digital-to-analog converter loop of electronics 604 is coupled to receive the electrical signal 134 from the system photo detector 128 and output an intensity control signal 150 having a DC voltage offset that does not vary with the intensity of the light as received at the system photo detector 128. As illustrated in FIG. 6, signal processing electronics 604 outputs a digital control signal that is converted to analog (at 622) and amplified (at 624) to generate the bias modulation signal that drives modulation of the light beams in IOC 112.

Figure 7:
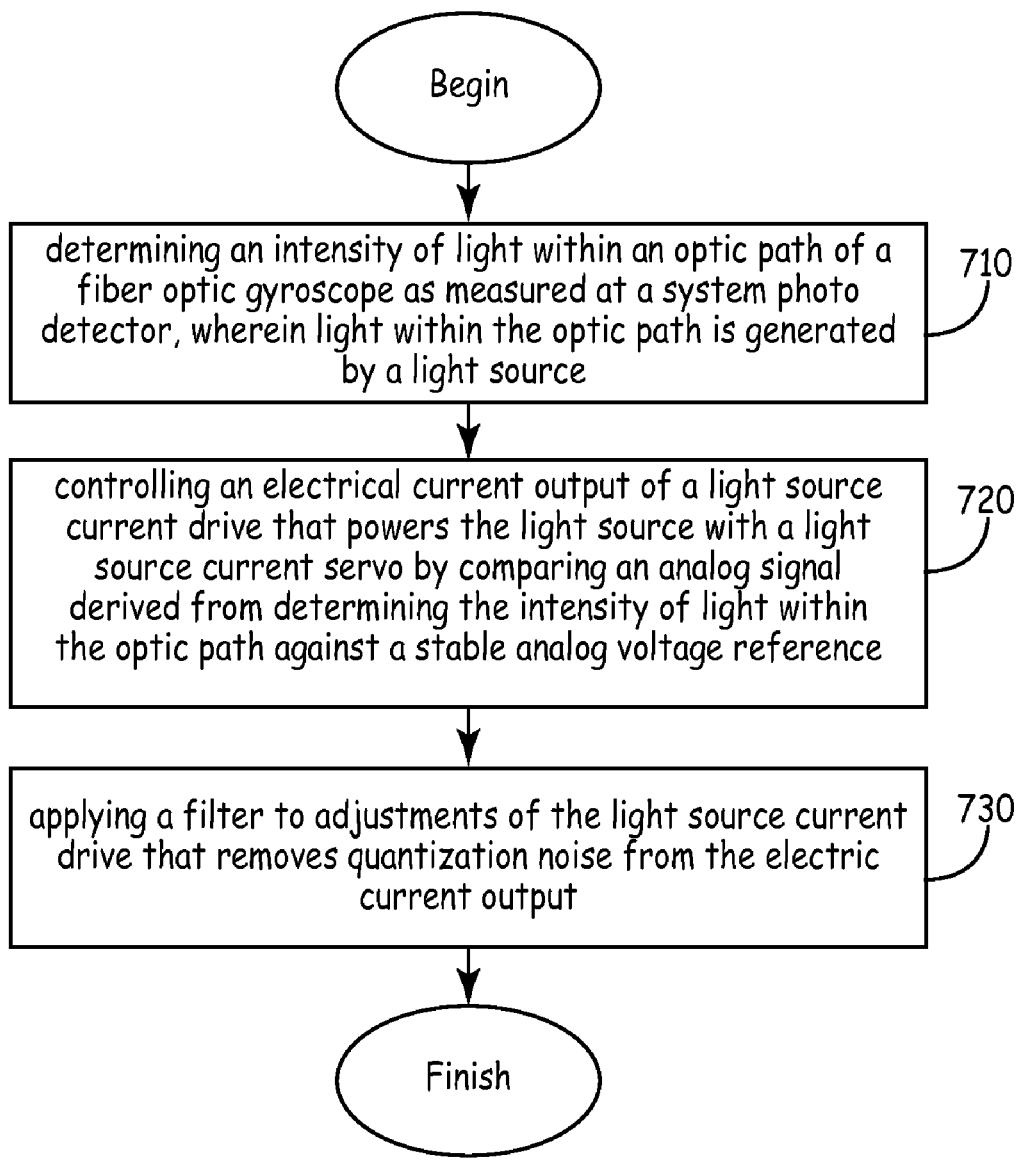
FIG. 7 is a flow diagram of an embodiment of a method embodiment of one embodiment of the present invention.

FIG. 7 is a flow diagram of an embodiment of a method of one embodiment of the present invention. The method begins at 710 with determining an intensity of light within an optic path of a fiber optic gyroscope as measured at a system photo detector, wherein light within the optic path is generated by a light source. The method proceeds to 720 with controlling an electrical current output of a light source current drive that powers the light source with a light source current servo by comparing an analog signal derived from the intensity of light within the optic path, for example at the system photo detector, against a stable analog voltage reference.

The method proceeds to 730 with applying a filter to adjustments of the light source current drive that removes quantization noise from the electric current output. In one embodiment, applying a filter to adjustments of the light source current drive comprises applying an ultra low bandwidth filter to a signal that controls the light source current drive. By utilizing a light source current servo having a long time constant (on the order of seconds to hours, for example), the light source current is slowly and smoothly adjusted without abrupt steps, glitches or hysteresis. In another embodiment, applying a filter comprises processing a digital loop output signal with a delta sigma integrated feedback loop that integrates out a noise spectrum from the digital loop output signal. In other embodiments, other forms of filtering may be applied, or combined, as would be appreciated by one of ordinary skill in the art upon reading this specification.

In one embodiment of the method presented in FIG. 7, the light source current servo functions to receive an output signal from an intensity D/A converter within a set of signal processing electronics, and filters the signal to achieve a light source current that will drive the gyroscope's light source with no significant quantization noise. This filtered output, which will slowly vary over the life of the FOG, is fed to the light source current drive to drive the light source. Further, by signal processing electronics which includes an A/D centering control loop and a digital intensity normalization circuit, the FOG gains insensitivity to external forces.

This description is presented for purposes of illustration, and is not intended to be exhaustive or limited to the embodiments disclosed. Variations and modifications may occur, which fall within the scope of the following claims. For example, the embodiments described above relate to a FOG, but it is understood that any variation or species of FOG can utilize the described invention. Furthermore, some of the components described below may be implemented using either digital or analog circuitry, or a combination of both, and, where appropriate, realized through software executing on a suitable processing circuitry and machine-readable storage mediums.

Several means are available to implement the systems and methods of the current invention as discussed in this specification. These means include, but are not limited to, digital computer systems, microprocessors, application-specific integrated circuits (ASIC), general purpose computers, programmable controllers and field programmable gate arrays (FPGAs), all of which may be generically referred to herein as "processors". For example, in one embodiment, signal processing may be incorporated by an FPGA or an ASIC, or alternatively by an embedded or discrete processor. Therefore other embodiments of the present invention are program instructions resident on computer readable media which when implemented by such means enable them to implement embodiments of the present invention. Computer readable media include any form of a physical computer memory device. Examples of such a physical computer memory device include, but is not limited to, punch cards, magnetic disks or tapes, optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to, computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A fiber optic gyroscope, the fiber optic gyroscope comprising:
 a light source current servo coupled to a gyroscope light source that transmits light through an optic path, wherein the light source current servo controls intensity of the light through the optic path via a light source current drive that supplies current to power the gyroscope light source; and
 an intensity control signal processor coupled to the optic path via a photo detector, wherein the intensity control signal processor outputs an intensity control signal to the light source current servo, wherein the intensity control signal is a function of intensity of the light as received at the photo detector;
 wherein the light source current servo compares the intensity control signal against a stable analog voltage reference to adjust the light source current drive and drive optical power at the photo detector towards a constant optical power level.

2. The fiber optic gyroscope of claim 1, wherein the intensity control signal processor further comprises: an intensity digital-to-analog converter coupled to a processor, wherein the intensity digital-to-analog converter receives a digital intensity control word from the processor that provides a digital representation of optical power received at the photo detector.

3. The fiber optic gyroscope of claim 2, wherein the intensity digital-to-analog converter outputs an analog intensity signal representing intensity of the light as received at the photo detector.

4. The fiber optic gyroscope of claim 2, wherein the light source current servo applies a filter to adjustments of the light source intensity drive to remove quantization noise.

5. The fiber optic gyroscope of claim 4, wherein the light source current servo loop further comprises:
   a delta sigma circuit that receives the digital intensity control word, wherein the delta sigma circuit's output signal is a pulse width modulated (PWM) intensity control signal;
   an intensity digital-to-analog converter that converts the output of the delta sigma circuit into analog.

6. The fiber optic gyroscope of claim 5, wherein the delta sigma circuit comprises:
   an integrated feedback loop which integrates out a noise spectrum from the digital loop output signal.

7. The fiber optic gyroscope of claim 1, wherein the intensity control signal processor further comprises:
   an intensity digital-to-analog converter coupled to receive a digital intensity control word and output a signal representing intensity of the light as received at the photo detector;
   a digital intensity normalization circuit coupled to the intensity digital-to-analog converter;
   a rate demodulation circuit coupled to the intensity digital-to-analog converter; and
   a relative intensity noise demodulation circuit coupled to the intensity digital-to-analog converter;
   an analog-to-digital offset center control loop coupled to the intensity digital-to-analog converter;
   a relative intensity noise subtraction circuit coupled to the digital intensity normalization circuit;
   wherein an output of the rate demodulation circuit is digitally normalized by a digital measure of optical intensity to produce a normalized rate;
   wherein an output of the relative intensity noise demodulation circuit is digitally normalized by a digital measure of optical intensity;
   wherein the normalized rate and an output of the relative intensity noise demodulation circuit are combined to produce a relative intensity noise-reduced measure of rotation rate.

8. The fiber optic gyroscope of claim 7, wherein the relative intensity noise-reduced rotation rate signal is used to generate an error suppression modulation signal that drives modulation of the light travelling through the optical path.

9. The fiber optic gyroscope of claim 7, further comprising a relative intensity noise photo detector coupled to the optic path, the relative intensity noise subtraction circuit further coupled to the relative intensity noise photo detector.

10. The fiber optic gyroscope of claim 1, wherein the optic path further comprises:
    a fiber coil having a first end and a second end;
    an integrated optical circuit coupled to the first end and the second end of the fiber coil; and
    an optical device that directs the light from the gyroscope light source to the integrated optical circuit;
    wherein the integrated optical circuit splits the light from the light source into a first light beam directed to the first end of the fiber coil and a second light beam directed to the second end of the fiber coil;
    wherein the optical device further directs a returning light beam from the integrated optical circuit to the photo detector.

11. A method for operating a fiber optic gyroscope, the method comprising:
    determining an intensity of light within an optic path of a fiber optic gyroscope as measured at a photo detector, wherein light within the optic path is generated by a light source;
    controlling an electrical current output of a light source current drive that powers the light source with a light source current servo by comparing an analog signal derived from determining the intensity of light within the optic path against a stable analog voltage reference;
    applying a filter to adjustments of the light source current drive that removes at least quantization noise from the electric current output.

12. The method of claim 11, wherein determining the intensity of light within the optic path of the fiber optic gyroscope further comprises:
    processing an electrical signal from the photo detector to provide an intensity control signal to the light source current servo having a DC voltage offset that does not vary with the intensity of the light as received at the photo detector.

13. The method of claim 11, wherein applying a filter to adjustments of the light source current drive comprises applying an ultra low bandwidth filter to a signal that controls the light source current drive.

14. The method of claim 11, wherein determining the intensity of light within the optic path of the fiber optic gyroscope further comprises:
    processing an electrical signal from the photo detector through a digital-to-analog converter loop to output a digital loop output signal representing intensity of the light as received at the photo detector.

15. The method of claim 14, wherein applying a filter to adjustments of the light source current drive comprises processing the digital loop output signal with a delta sigma integrated feedback loop that integrates out a noise spectrum from the digital loop output signal.

16. A fiber optic gyroscope, the fiber optic gyroscope comprising:
    a light source;
    a fiber coil having a first end and a second end;
    an integrated optical circuit coupled to the first end and the second end of the fiber coil;
    an optical device that directs light transmitted from the light source to the integrated optical circuit, wherein the integrated optical circuit splits the light from the light source into a first light beam directed to the first end of the fiber coil and a second light beam directed to the second end of the fiber coil;
    a photo detector coupled to the optical device;
    a light source current servo coupled to the light source, wherein the light source current servo controls intensity of the light transmitted from the light source by adjusting an electric current that powers the light source; and
    an intensity control signal processor coupled to the photo detector, wherein the intensity control signal processor outputs an intensity control signal to the light source current servo, wherein the intensity control signal is a function of intensity of the light as received at the photo detector;
    wherein the light source current servo compares the intensity control signal against a stable analog voltage reference to adjust the light source current drive, wherein the light source current servo applies a filter to adjustments of the light source current drive.

17. The fiber optic gyroscope of claim 16, wherein the intensity control signal processor closure further comprises:
- a digital-to-analog converter loop coupled to receive an electrical signal from the photo detector and output an intensity control signal having a DC voltage offset that does not vary with the intensity of the light as received at the photo detector.

18. The fiber optic gyroscope of claim 17, wherein the intensity digital-to-analog converter loop outputs a digital loop output signal representing intensity of the light as received at the photo detector.

19. The fiber optic gyroscope of claim 16, wherein the light source current servo loop further comprises:
- a delta sigma circuit that receives the loop output signal output from the digital-to-analog converter loop, wherein the digital loop output signal is a digital pulse width modulation (PWM) signal, wherein the delta sigma circuit comprises an integrated feedback loop that integrates out a noise spectrum from the digital loop output signal;
- an intensity digital-to-analog converter that converts the output of the delta sigma circuit into analog.

20. The fiber optic gyroscope of claim 16 further comprising a relative intensity noise photo detector coupled to the optical device;
- wherein the intensity control signal processor further comprises:
- an intensity digital-to-analog converter loop coupled to receive an electrical signal from the photo detector and output a signal representing intensity of the light as received at the photo detector;
- a normalization circuit coupled to the intensity digital-to-analog converter loop;
- a demodulation circuit coupled to the intensity digital-to-analog converter loop; and
- a relative intensity noise subtraction circuit coupled to the normalization circuit and the relative intensity noise photo detector, wherein an output of the demodulation circuitry is summed with an output of the relative intensity noise subtraction circuitry to produce a relative intensity noise-reduced measure of rotation rate and error suppression modulation signal.

* * * * *